INVENTOR.
RALPH F. BECKER
BY
ATTORNEY

Aug. 13, 1968     R. F. BECKER     3,396,696
LENS TURNER FOR HIGH VACUUM EVAPORATORS
Filed Oct. 6, 1966     2 Sheets-Sheet 2
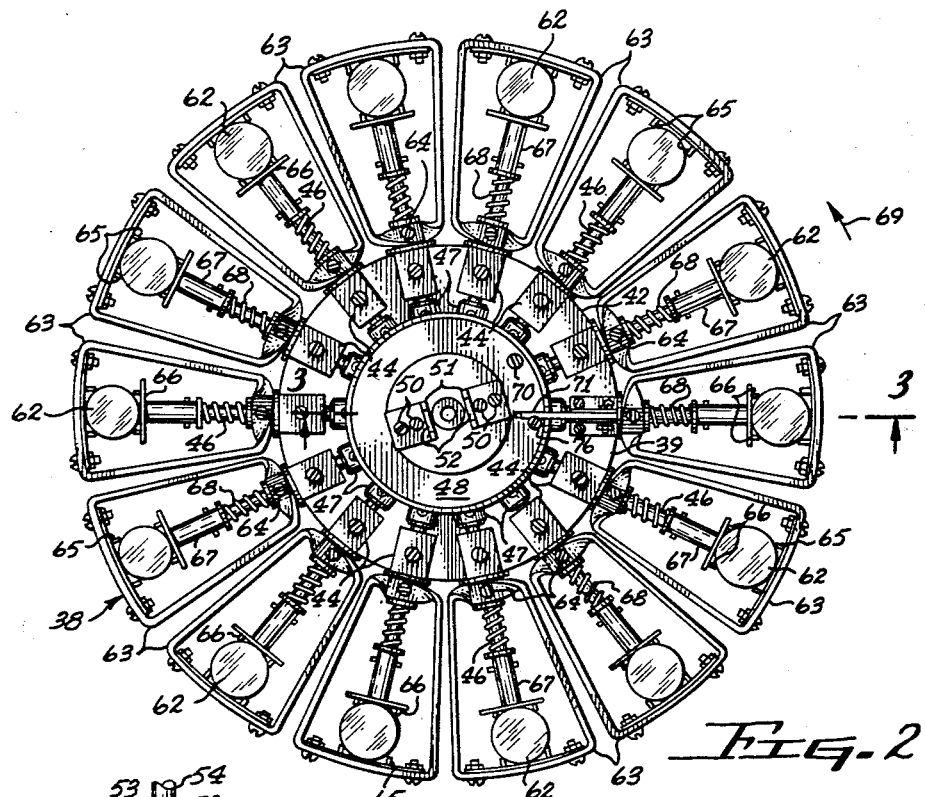
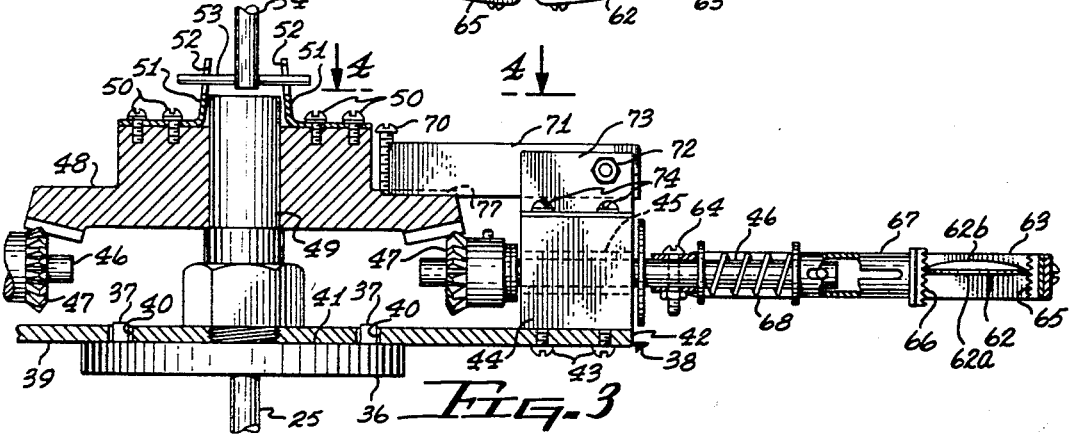
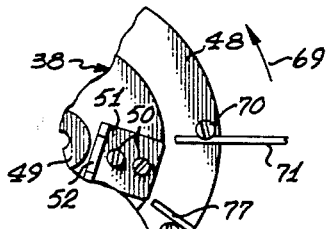
INVENTOR.
RALPH F. BECKER
BY
Willard S. Gowen
ATTORNEY

United States Patent Office 3,396,696
Patented Aug. 13, 1968

3,396,696
LENS TURNER FOR HIGH VACUUM EVAPORATORS
Ralph F. Becker, 6820 E. Pinchot Ave., Scottsdale, Ariz. 85251
Filed Oct. 6, 1966, Ser. No. 584,890
2 Claims. (Cl. 118—49)

This invention pertains to improvements in lens turning devices for high vacuum evaporator vacuum chambers.

One of the objects of this invention is to provide an efficient and easy to operate procedure for turning a series of objects within an evacuated chamber or bell jar of high vacuum evaporator machine for use in optical and metal coating for mirrors, lenses and the like.

Still another object is to provide a rotary lens turning fixture for a series of lenses for use in an evacuated bell jar of a high vacuum evaporator machine which may be remotely operated through the bell jar to turn the lenses during the operation of the machine under vacuum.

It is a further object of this invention to provide a holding fixture lens turner which may be loaded and unloaded exterior of the bell jar or vacuum chamber but which may be actuated magnetically through the bell jar when placed therein under vacuum to turn one face or the other of the lenses into operative treatment position.

Further features and advantages of this invention will appear from a detailed description of the drawings in which:

FIG. 2 is an enlarged horizontal section of the lens holding and turning fixture indicated on the line 2—2 of FIG. 1.

FIG. 3 is an enlarged fragmentary sectional view on the line 3—3 of FIG. 2.

FIG. 4 is an enlarged fragmentary plan view on the line 4—4 of FIG. 3.

Figure 1:
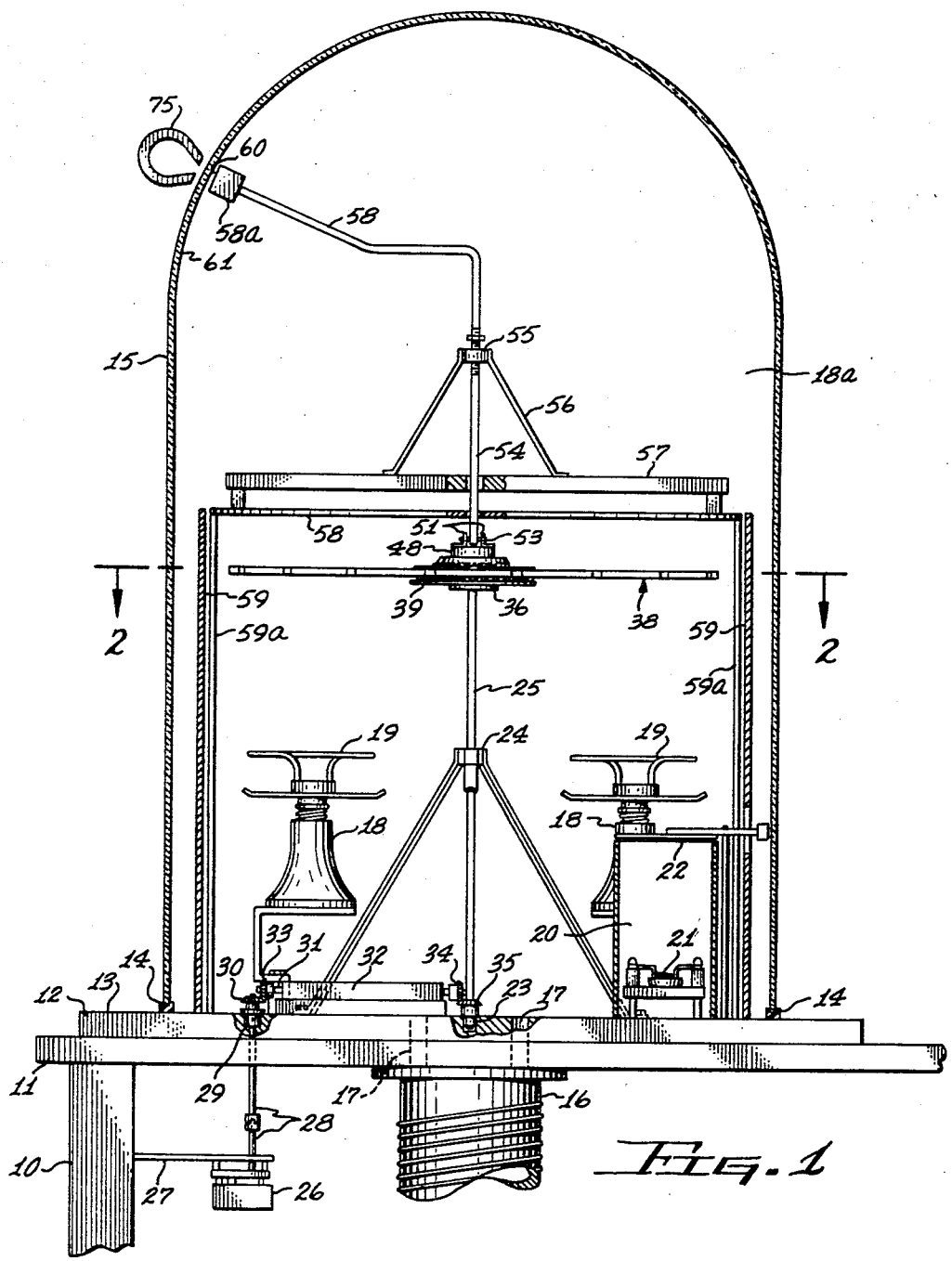
FIG. 1 is a vertical sectional view through the bell jar and work holding and treating portion of a high vacuum evaporator machine incorporating the features of this invention.

As an example of one embodiment of this invention there is shown a portion of a high vacuum evaporator machine having a frame 10 supporting the work table 11 to which is fixed the base plate 12 having the top surface 13 which engages and supports the usual gasket 14 of the bottom edge of the transparent non-magnetic bell jar 15. The usual vacuum pump and control system, not shown, is connected by the pipe line 16 and passageways 17 into the vacuum chamber 18a formed by the top surface 13 of the base plate 12 and the bell jar 15. Arranged around the periphery of the base plate 12 within the bell jar 15 are a plurality of suitable heaters 18 radiating upwardly from the heating coils or radiators 19. A suitable vaporizer unit 20 having a vaporizing crucible 21 for the material to be applied to the lens surfaces has an upwardly discharging outlet 22 in the top thereof, all of which is conventional for the aforementioned high vacuum evaporator machines.

Centrally located and supported on suitable bearings 23 and 24 on the base plate within the bell jar 15 is the vertically disposed work spindle 25. This work spindle 25 is driven at a desired speed by a suitable drive motor 26 mounted on a bracket 27 fixed to the frame 10 and having a drive shaft 28 journaled in a suitable bearing 29 carried in the base plate 12 with a bevel gear 30 fixed to its upper end immediately above the bearing 29. An intermediate shaft 31 is suitably journaled in the bracket 32 fixed to the base plate 12 and has a bevel gear 33 fixed on one end engaging the bevel gear 30 on the drive shaft 28 and bevel gear 34 on its other end engaging the bevel gear 35 fixed on the lower end of the work spindle 25. Fixed to the top end of the work spindle 25, FIG. 3, is the work fixture support and drive disc 36 having the upstanding drive pins 37 fixed therein.

Referring particularly to FIGS. 2, 3 and 4, the work holding and turning fixture indicated generally at 38 comprises a main support disc 39 having perforations 40 arranged to receive the driving pins 37 when the fixture is placed on the top surface 41 of the drive disc 36 of the work spindle 25 to be thereby positioned and revolved by the spindle in operative position within the bell jar 15.

Fixed about the periphery 42 of main support disc 39 by suitable screws 43 are a series of circumferentially spaced bearing blocks 44 in which are journaled on appropriate bearings 45 a series of radially disposed work holding and turning shafts 46 having bevel gears 47 fixed on their inner ends which engage a common actuating bevel gear 48 which is journaled on a stud shaft 49 fixed in axial alignment with the work spindle 25 on the main support disc 39 so that rotation of the common bevel gear 48 relative to the main support disc 39 causes simultaneous rotation of the work holding and turning shafts 46.

Fixed to the upper end of the common bevel gear 48 by suitable screws 50 are a pair of diametrically disposed clips 51 each having upwardly extending slots 52 which demountably receive a cross pin 53 fixed in the lower end of the lens turning shaft 54 which is journaled in a suitable bearing 55 carried in a suitable support 56 and 57 secured to the top 58 of the usual inner cage 59a and heat shield 59 conventionally used in such operations. The upper end of the lens turning shaft 54 has a radially outwardly extending portion 58 terminating in a block 58a of magnetic material having an outer face 60 closely adjacent the inside surface 61 of the bell jar 15.

Suitable means are provided on the outer ends of the work holding and turning shafts 46 for gripping the lenses 62 and holding them in operative position for treatment. To this end there is provided a yoke 63 fixed at its inner end by a bolt 64 to the shaft 46 and having in its outer end suitable work engaging jaws 65 arranged to engage the edges of the lens 62. Yielding opposing work engaging jaws 66 are carried on a radially movable support 67 on the shaft 46 and having a compression spring 68 which normally yieldingly urges the jaws 66 toward the jaws 65 for releasably securing the lens in operative position on the yokes 63.

To place the apparatus in operation: the work holding and turning fixture 38 is first loaded with lenses 62 by radially depressing the supports 67 on the shafts 46 inwardly and then placing the lens 62 or other workpieces between the jaws 65 and 66, releasing the support 67 to lock the lenses in operative position shown best in FIG. 3. A work holding and turning fixture 38 thus loaded is then placed on the top surface 41 of the fixture support and drive disc 36 of the work spindle 25 as shown in FIG. 3. The lens turning shaft 54 is then placed in operative position as shown in FIG. 1 so that the cross pin 53 engages in the slots 52 of the clips 51. The heat shield 59 is then placed in position. The bell jar 15 is then put in position and the chamber 18a evacuated in the usual manner. The motor 26 is then energized causing the main support disc 39 to rotate in the direction of the arrow 69, FIG. 4. This causes a stop screw 70 fixed to the common bevel gear 48 to engage the outer end of a stop dog 71 pivotally mounted on a pivot screw 72 carried in the block 73 fixed to one of the bearing blocks 44 by suitable screws 74 causing the common bevel gear 48 to remain in a fixed position with the lenses turned with one face 62a facing downwardly for exposure to the heating elements 19 and the discharge opening 22 of the vaporizer 20. After a sufficient number of rotations of the disc 36 and the fixture 38 to properly coat the face 62a of the lenses, a magnet 75 is applied to the bell jar as shown in FIG. 1, with the motor 26 momentarily shut off to stop rotation, to the outer surface of the bell jar adjacent the magnetic block 58a and the magnet moved so as to rotate the lens turning shaft 54 in a counter-clockwise direction causing the common bevel gear 48 to rotate relative to the main support disc 39 which brings the stop dog 71 up against a second stop screw 76 and also causes the trip dog 71 to drop into a slot 77 in the common bevel gear 48 to at that time lock the common bevel gear 48 against relative movement with regard to the main support disc 39. The motor 26 is then energized again to start up rotation since the movement of the bevel gear 48 from stop position of the screw 70 to the stop screw 76, FIG. 4, has turned the lenses over to bring the other face 62b into operative position relative to the heating elements 19 and the discharge opening 22 of the vaporizer 20. Having completed this operation the bell jar chamber 18 is back-filled, the unit 54–58 is raised upwardly to release the pin 53 from clips 51 so that the work holding and turning fixture 38 can be removed radially from the machine, the lenses removed, the common bevel gear 48 moved back to the position 70 of FIG. 4 and new lenses applied and the aforementioned cycle repeated.

While the apparatus herein disclosed and described constitutes a preferred form of the invention, it is also to be understood that the apparatus is capable of mechanical alterations without departing from the spirit of the invention and that such mechanical arrangement and commerical adaptation as fall within the scope of the appendant claims are intended to be included herein.

What is claimed is:

1. In a lens turning apparatus for a high vacuum evaporator machine as set forth in claim 1 wherein said operating device includes a radially disposed arm journalled on said base plate about the axis of said work spindle and demountably connected to said actuating means of item H with said magnetic element at the outer end of said arm swinging around closely adjacent the inside surface of said bell jar when said work spindle is rotating and swingable by applying said magnet to the outside surface of said bell jar when said work spindle is stopped to thereby turn one or the other side of said lenses to operative position.

2. A lens turning apparatus for a high vacuum evaporator machine having:

(a) a frame,
(b) a base plate on said frame,
(c) a bell jar supported on said base plate forming a vacuum chamber with said base plate,
(d) heating and vaporizing means on said base plate within said bell jar,
(e) a vertically disposed work spindle supported on said base plate within said bell jar,
(f) a work holding and turning fixture demountably supported on, and rotatably driven by said work spindle,
(g) means on said fixture for releasably gripping and supporting lenses in operative position about the periphery of said fixture,
(h) actuating means movably mounted on said fixture operable to rotate said lens gripping means to present one or the other side of said lenses in operative position relative to said vaporizer means,
(i) said actuating means including a pair of angularly spaced stop screws and a trip dog to limit realtive rotation of said actuating means and said work holding and turning fixture including a locking slot adjacent one of said stop screws to positively releasably secure said actuating means against rotation relative to said fixture, and
(j) an operating device supported on said base plate connected to said actuating means for rotating said lens gripping means having a magnetic element closely adjacent the inside surface of said bell jar wherein said operating device may be actuated from the exterior of said bell jar by moving a magnet on the outside of said bell jar in proximity to said magnetic element.

References Cited
UNITED STATES PATENTS

| | | | |
|---|---|---|---|
| 2,160,981 | 6/1939 | O'Brien | 117—107 |
| 2,260,471 | 10/1941 | McLeod | 118—49 |
| 2,245,425 | 6/1941 | Aungst. | |
| 2,369,764 | 2/1945 | Ullrich | 118—49 |
| 2,410,720 | 11/1946 | Dimmick | 118—49 |
| 2,417,472 | 3/1947 | Dorff | 118—503 X |
| 2,997,979 | 8/1961 | Tassara | 118—49 |
| 3,312,190 | 4/1967 | Bradshaw. | |
| 3,336,898 | 8/1967 | Simmons et al. | |
| 2,532,971 | 12/1950 | Van Leer et al. | 118—49.1 X |

CHARLES A. WILLMUTH, *Primary Examiner.*

MORRIS KAPLAN, *Assistant Examiner.*